United States Patent [19]
Iwasaki et al.

[11] Patent Number: 5,777,723
[45] Date of Patent: Jul. 7, 1998

[54] PHOTOGRAPHIC PRINTING APPARATUS AND METHOD

[75] Inventors: Ryuichi Iwasaki; Mitsuru Miyauchi; Toshiro Akira, all of Wakayama, Japan

[73] Assignee: Noritsu Koki Co., Ltd., Wakayama, Japan

[21] Appl. No.: 558,978

[22] Filed: Nov. 13, 1995

Related U.S. Application Data

[63] Continuation of Ser. No. 258,159, Jun. 10, 1994, abandoned.

[30] Foreign Application Priority Data

Jun. 15, 1993 [JP] Japan ..................... 5-143850

[51] Int. Cl.$^6$ ..................... G03B 27/54
[52] U.S. Cl. ..................... 355/67; 355/77
[58] Field of Search ..................... 355/35, 38, 40, 355/41, 67, 71, 77

[56] References Cited

U.S. PATENT DOCUMENTS

| | | | |
|---|---|---|---|
| 4,368,484 | 1/1983 | Stemme et al. | 359/41 |
| 4,875,071 | 10/1989 | Shiota | 355/40 |
| 4,933,773 | 6/1990 | Shiota | 355/67 |
| 4,942,462 | 7/1990 | Shiota | 358/76 |
| 4,962,403 | 10/1990 | Goodwin et al. | 355/38 |
| 5,019,858 | 5/1991 | Suzuki | 355/35 |
| 5,122,831 | 6/1992 | Suzuki | 355/38 |
| 5,309,199 | 5/1994 | Frick | 355/41 |
| 5,412,451 | 5/1995 | Suzuki | 355/71 X |
| 5,463,445 | 10/1995 | Suzuki | 355/71 |

FOREIGN PATENT DOCUMENTS

| | | |
|---|---|---|
| A-227065 | 1/1987 | European Pat. Off. |
| A-227065 | 7/1987 | European Pat. Off. |
| A-255128 | 2/1988 | European Pat. Off. |
| A-424174 | 4/1991 | European Pat. Off. |
| 514909 | 11/1992 | European Pat. Off. |
| 1-191846 | 8/1989 | Japan |
| A-91 02286 | 2/1991 | WIPO |

OTHER PUBLICATIONS

Patent Abstracts Of Japan, vol. 14, No. 332 (P-1077), 17 Jul. 1990 & JP-A-02 110535 (Fuji Film) 23 Apr. 1990 (abstract).

*Primary Examiner*—Fred L. Braun
*Attorney, Agent, or Firm*—Townsend and Townsend and Crew LLP

[57] ABSTRACT

A photographic printing apparatus includes a reading device for reading image information from a film, and an exposure condition computing device for computing exposure conditions for exposing a photosensitive material based on the image information read by the reading device. The apparatus further includes an image information converter for converting the image information read by the reading device into image information expected to appear on the photosensitive material when the photosensitive material is exposed to the image information on the film under the exposure conditions computed by the exposure condition computing device. The image information converted by the image information converter is displayed on a monitor. The exposure condition computing device receives instructions through a control panel to correct the exposure conditions for the image information displayed on the monitor, or instructions not to correct the exposure conditions. An exposure device exposes the photosensitive material under exposure condition computed by the exposure condition computing device based on correcting instructions inputted through the control panel. The exposure device is operable in parallel with an input from the control panel to the exposure condition computing device, to exposure the photosensitive material to image information for which the exposure conditions have been corrected based on the correcting instructions from the control panel or for which non-correction instructions have been received.

8 Claims, 8 Drawing Sheets

PHOTOGRAPHIC PRINTING APPARATUS AND METHOD

This is a continuation of application Ser. No. 08/258,159, filed Jun. 10, 1994, now abandoned.

BACKGROUND OF THE INVENTION

1. Field of the Invention

The present invention relates to photographic printing apparatus. More particularly, the invention relates to a photographic printing apparatus having a reading device for reading image information from a film, an exposure condition computing device for computing exposure conditions for exposing a photosensitive material based on the image information read by the reading device, an image information converting device for converting the image information read by the reading device into image information expected to appear on the photosensitive material when the photosensitive material is exposed to the image information on the film under the exposure conditions computed by the exposure condition computing device, a monitor for displaying the image information converted by the image information converting device, a correcting instruction input device for inputting to the exposure condition computing device instructions to correct the exposure conditions for the image information displayed on the monitor or instructions not to correct the exposure conditions, and an exposure device for exposing the photosensitive material under exposure condition computed by the exposure condition computing device based on the correcting instructions from the correcting instruction input device.

2. Description of the Related Art

This photographic printing apparatus reads image information from a film, and computes exposure conditions from the image information read, for exposing a photosensitive material. It is possible to display so-called simulated image information on the monitor, which corresponds to image information expected to appear on the photosensitive material when the photosensitive material is exposed under the exposure conditions computed.

The operator of this photographic printing apparatus observes the image information displayed on the monitor, and determines whether the exposure conditions computed by the exposure condition computing device are satisfactory. If these exposure conditions are satisfactory, the operator inputs instructions through the correcting instruction input device, indicating that the exposure conditions need not be corrected. If the exposure conditions require correction, the operator inputs appropriate correcting instructions through the correcting instruction input device.

Upon receipt of the correcting instructions from the correcting instruction input device, the exposure condition computing device carries out a correcting computation to obtain new exposure conditions. The exposure device exposes the photosensitive material to the image information on the film under the corrected exposure conditions.

With this construction, when the exposure conditions computed by the exposure condition computing device are not satisfactory, the operator looking at the monitor may correct the exposure conditions before actual exposure of the photosensitive material. An error in exposing the photosensitive material may be precluded in this way.

The conventional photographic printing apparatus alternately allows the operator to observe image information on the monitor and input correcting instructions, and causes the exposure device to expose the photosensitive material.

The exposure device does not carry out an exposing operation while the operator is observing image information on the monitor to determine whether the exposure conditions are satisfactory or not. The exposing operation must wait until final exposure conditions are determined. Thus, improvement has been desired from the viewpoint of exposure processing efficiency.

SUMMARY OF THE INVENTION

The present invention has been made having regard to the state of the art noted above, and its object is to provide a photographic printing apparatus with improved exposure processing efficiency.

The above object is fulfilled, according to the present invention, by a photographic printing apparatus comprising a reading device for reading image information from a film, an exposure condition computing device for computing exposure conditions for exposing a photosensitive material based on the image information read by the reading device, an image information converting device for converting the image information read by the reading device into image information expected to appear on the photosensitive material when the photosensitive material is exposed to the image information on the film under the exposure conditions computed by the exposure condition computing device, a monitor for displaying the image information converted by the image information converting device, a correcting instruction input device for inputting to the exposure condition computing device instructions to correct the exposure conditions for the image information displayed on the monitor or instructions not to correct the exposure conditions, and an exposure device for exposing the photosensitive material under exposure condition computed by the exposure condition computing device based on the correcting instructions from the correcting instruction input device, wherein the exposure device is operable in parallel with inputs from the correcting instruction input device (e.g., the control panel) to the exposure condition computing device, to expose the photosensitive material to image information for which the exposure conditions have been corrected based on the correcting instructions from the correcting instruction input device or for which non-correction instructions have been received.

According to this construction, while the operator is observing the image information displayed on the monitor to determine whether the exposure conditions computed by the exposure condition computing device are satisfactory or not, the exposure device may effect exposure of the photosensitive material to the image information for which the operator has already determined as to acceptability of the exposure conditions, and for which the exposure conditions have been corrected based on the correcting instructions from the correcting instruction input device or non-correction instructions have been received.

Consequently, the exposure device is operable to effect exposure while the operator is observing the image information displayed on the monitor to determine whether the exposure conditions computed by the exposure condition computing device are satisfactory or not. This diminishes waiting time of the exposure device to improve the exposure processing efficiency of the photographic printing apparatus.

The photographic printing apparatus according to the present invention may further comprise a memory for storing image information corresponding to a plurality of frames as read by the reading device, the monitor displaying image information in a/the plurality of frames stored in the memory.

With this construction, the reading device successively reads image information from a plurality of frames on the film, and such image information is stored in the memory.

All or part of the image information corresponding to the plurality of frames is read from the memory for the exposure condition computing device to compute exposure conditions for each frame. The image information converting device converts the image information in these frames for display on the monitor.

The operator determines acceptability of the exposure conditions for the image information in the plurality of frames displayed on the monitor, and inputs correcting instructions through the correcting instruction input device as necessary. The exposure condition computing device corrects the exposure conditions in response to the correcting instructions.

While the operator is observing the image information in the plurality of frames displayed on the monitor to determine whether the exposure conditions are satisfactory or not, the exposure device successively effects exposure of the photosensitive material to the image information for which the operator has determined as to acceptability of the exposure conditions.

Thus, acceptability of exposure conditions may be determined in a batch for the image information in a plurality of frames displayed on the monitor. The photographic printing apparatus provided by the present invention has improved exposure processing efficiency with the additional advantage of allowing the operator to compare the frames displayed to facilitate his or her judgment of exposure conditions.

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENT

A photographic printing apparatus according to the present invention will be described with reference to the drawings.

Figure 1:
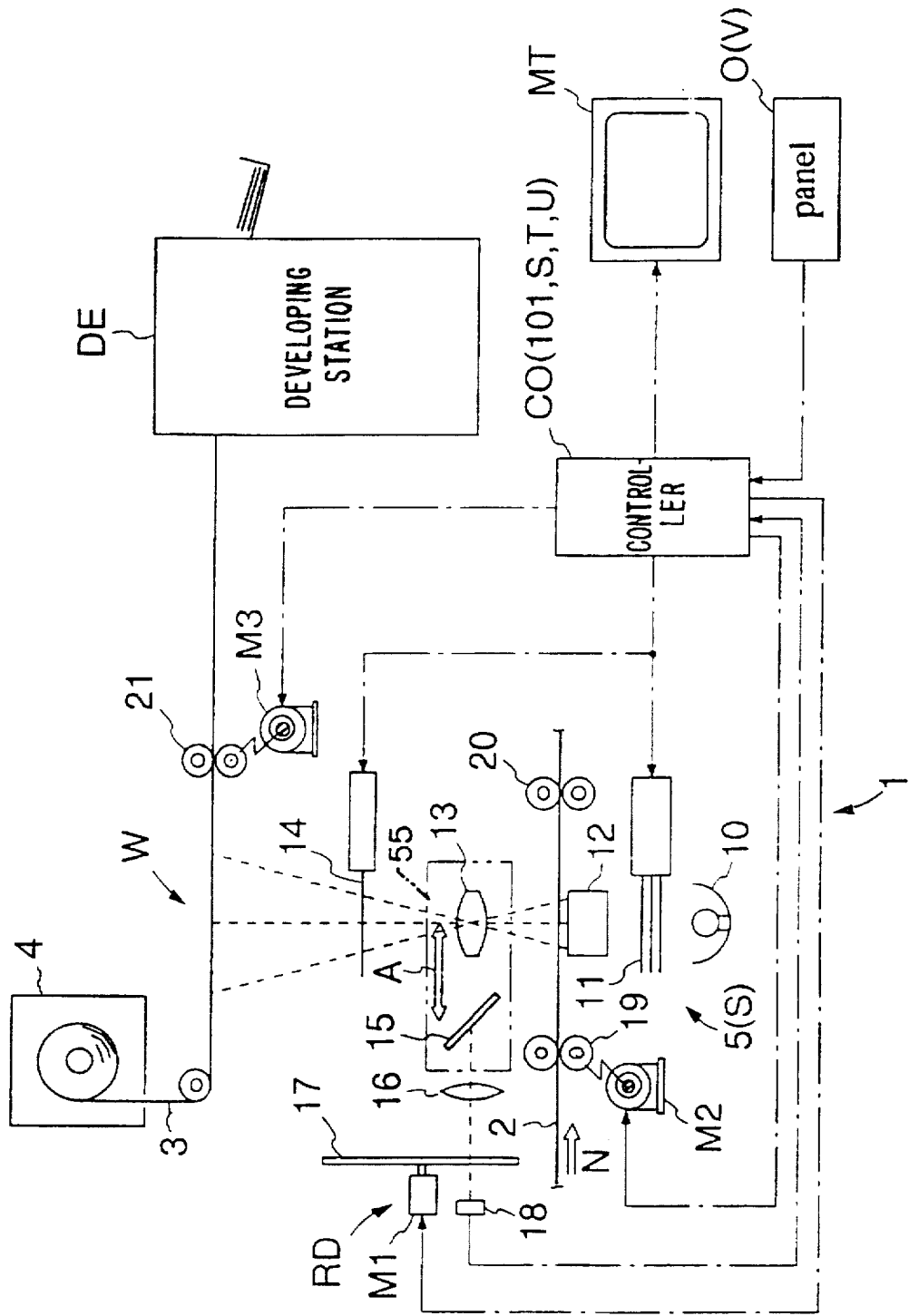
FIG. 1 is a schematic view showing an outline of a photographic printing apparatus according to the present invention.

As shown in FIG. 1, a photographic printing apparatus 1 includes a projecting and exposing station 5 for projecting image information on film 2 to printing paper 3 acting as a photosensitive material, a developing station DE for developing the printing paper 3 exposed in the projecting and exposing station 5, and a controller CO for controlling various components of the photographic printing apparatus 1. This apparatus 1 further includes a control panel O for inputting various instructions, and a monitor MT for displaying image information, both connected to the controller CO.

The printing paper 3 is stored in roll form in a printing paper magazine 4. The printing paper 3 is drawn from the magazine 4, exposed at the projecting and exposing station 5, developed at the developing station DE, and cut and discharged in a size for containing image information corresponding to one frame.

The components of this apparatus will be described in detail next.

The projecting and exposing station 5 includes a light source 10, a dimmer filter 11 for adjusting color balance of light for irradiating the film 2, a mirror tunnel 12 for uniformly color-mixing the light having passed through the dimmer filter 11, a printing lens 13 for forming an image of the film 2 on the printing paper 3, and a shutter 14, arranged along the same optical axis forming an exposure optical path.

A reading device RD is disposed laterally of the printing lens 13 for reading image information from the film 2. The reading device RD includes a reflecting mirror 15, a lens 16, a rotary color filter 17 rotatable by a motor M1 and having R (red), G (green) and B (blue) color filters arranged peripherally thereof, and a CCD image sensor 18. The reflecting mirror 15 is mounted along with the printing lens 13 on a movable deck not shown.

The movable deck 55 carrying the printing lens 13 and reflecting mirror 15 is slidable in directions indicated by an arrow A in FIG. 1, to switch between a position to place the printing lens 13 on the exposure optical path, and a position to place the reflecting mirror 15 on the exposure optical path.

When the printing lens 13 is placed on the exposure optical path, the image information of the film 2 is formed on the printing paper 3 by the printing lens 13. When the reflecting mirror 15 is placed on the exposure optical path, the image information of the film 2 is reflected by the reflecting mirror 15 and formed on a light receiving plane of CCD image sensor 18 by the lens 16.

The CCD image sensor 18 detects the image information from the film 2 as separated into the R, G and B colors by rotation of the rotary color filter 17. This permits exposure conditions to be computed based upon image information.

Rollers 19 are disposed on a transport path of the film 2 upstream of the exposure optical path. Rollers 20 are disposed on the transport path downstream of the exposure optical path. The rollers 19 and 20 are driven together by a motor M2.

At the projecting and exposing station 5, as noted above, the CCD image sensor 18 reads the image information from the film 2 when the reflecting mirror 15 is placed on the exposure optical path, and the image information from the film 2 is formed on the printing paper 3 when the printing lens 13 is placed on the exposure optical path.

On a transport path of the printing paper 3 downstream of an exposure position W are rollers 21 for transporting the printing paper 3 and a motor M3 for driving the rollers 21.

Though not shown in the drawings, the developing station DE includes a plurality of tanks filled with treating solutions for developing the exposed printing paper 3. The printing paper 3 passes through one tank after another to be developed.

Figure 2:
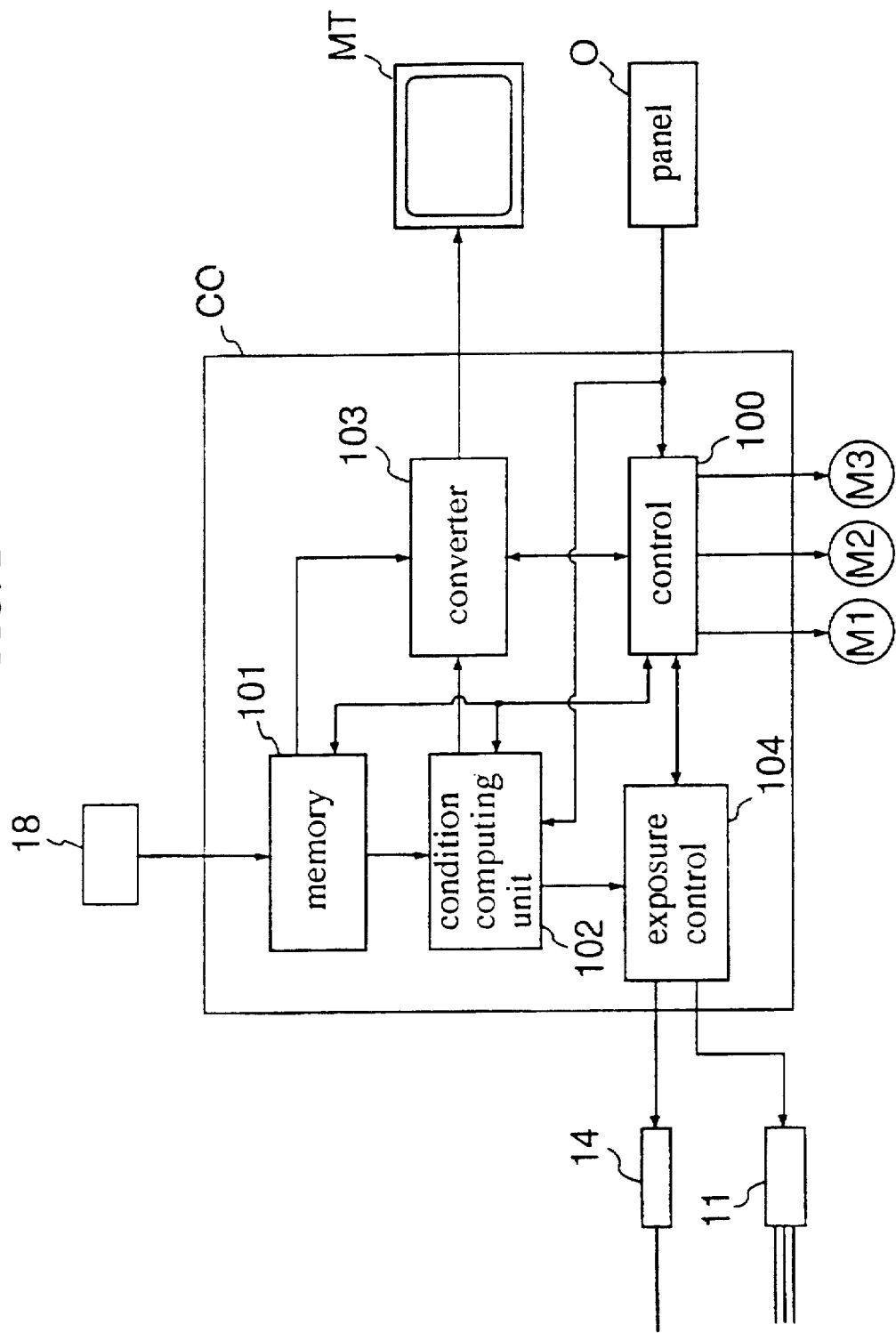
FIG. 2 is a block diagram of a principal portion of the photographic printing apparatus.

As shown in FIG. 2, the controller CO includes a control unit 100, an image information memory 101, an exposure condition computing unit 102, an image information converter 103 and an exposure control unit 104. The image information memory 101 stores image information read by the CCD image sensor 18. The exposure condition computing unit 102 reads the image information from the image information memory 101 and determines exposure conditions for forming the image information on the printing paper 3. The exposure control unit 104 controls the dimmer filter 11 and shutter 14 based on the exposure conditions determined by the exposure condition computing unit 102 to expose the printing paper 3. The image information converter 103 reads the image information from the image information memory 101, and converts the image information to image information for display on the monitor MT based on the exposure conditions determined by the exposure condition computing unit 102. The control unit 100 controls the image information memory 101, exposure condition computing unit 102, image information converter 103 and exposure control unit 104. The control unit 100 also controls the motors M1, M2 and M3.

The image information converter 103 stores various parameters for use in converting the image information, such as negative to positive conversion. These parameters are selected to display image information on the screen of monitor MT based on the exposure conditions determined by the exposure condition computing unit 102, which image information is equivalent to the image information to be expressed on the printing paper 3. This provides a method wherein image information read is converted into image information expected to appear, that is exposed on the printing paper 3.

The control panel O includes density correction keys for instructing variations in exposure of Y (yellow), M (magenta) and C (cyan) or average variations in exposure corresponding to density variations of a picture. In response to such correcting instructions, the exposure condition computing unit 102 carries out corrective operations to determine new exposure conditions.

When the exposure condition computing unit 102 obtains new exposure conditions upon instructions from the control panel O, the image information converter 103 converts image information based on the new exposure conditions, and transmits resulting image information to the monitor MT for display. Thus, the image information displayed on the monitor MT is corrected according to correcting instructions from the control panel O.

When a non-correcting instruction is inputted through the control panel O indicating that no correction is required, the exposure conditions initially determined by the exposure condition computing unit 102 are utilized as they are for exposure.

The image information memory 101 has a capacity for storing image information corresponding to a plurality of frames of the film 2 as read by the CCD image sensor 18. As described hereinafter, the image information memory 101 is capable of storing image information from all frames of one film 2.

With image information corresponding to a plurality of frames stored in the image information memory 101, the image information converter 103 may read so much image information from the memory 101 for conversion. Thus, image information corresponding to a plurality of frames may be displayed simultaneously on the monitor MT.

Figure 3:
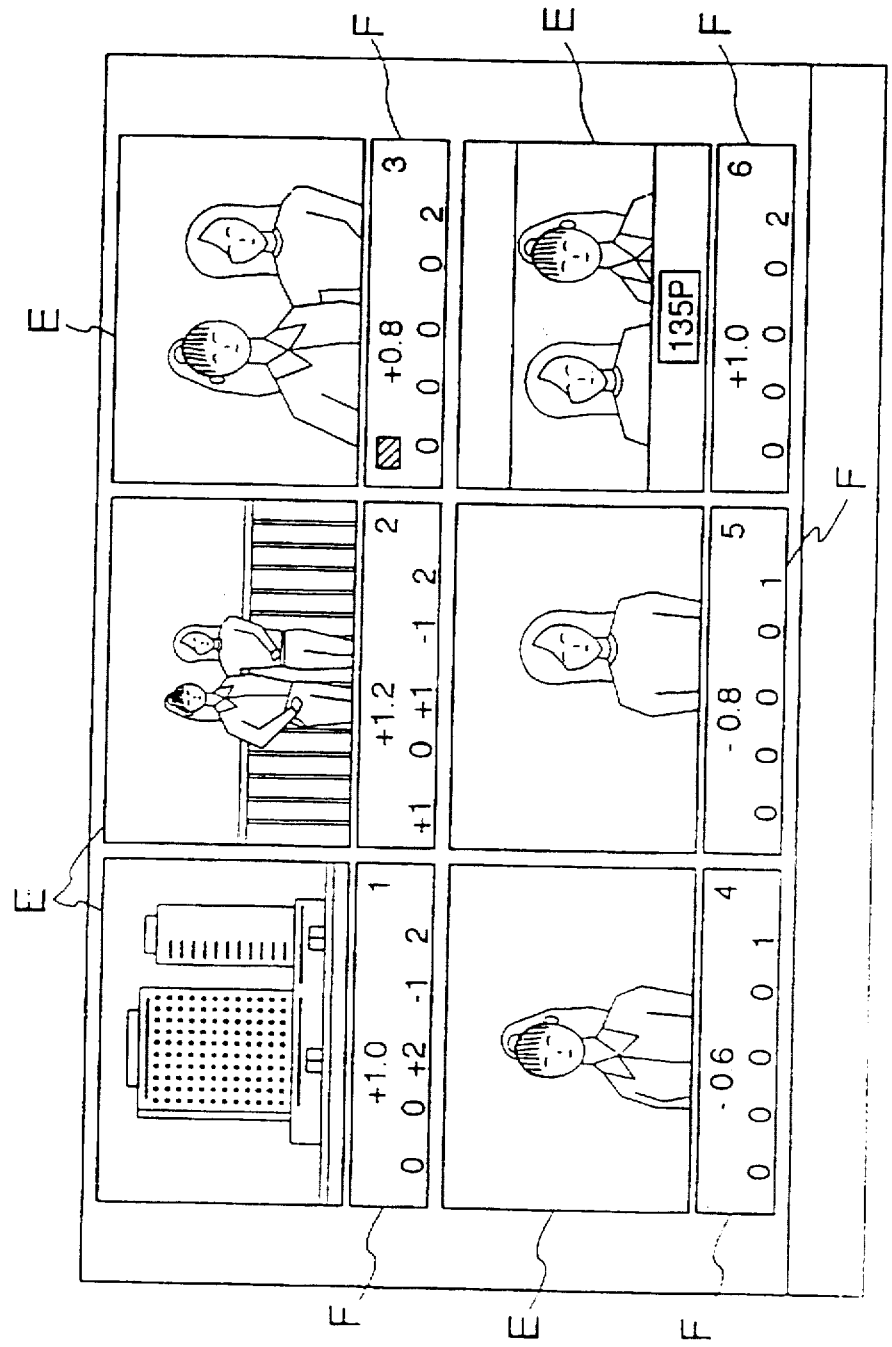
FIG. 3 is a view showing an example of images displayed on a monitor of the photographic printing apparatus.
Figure 4:
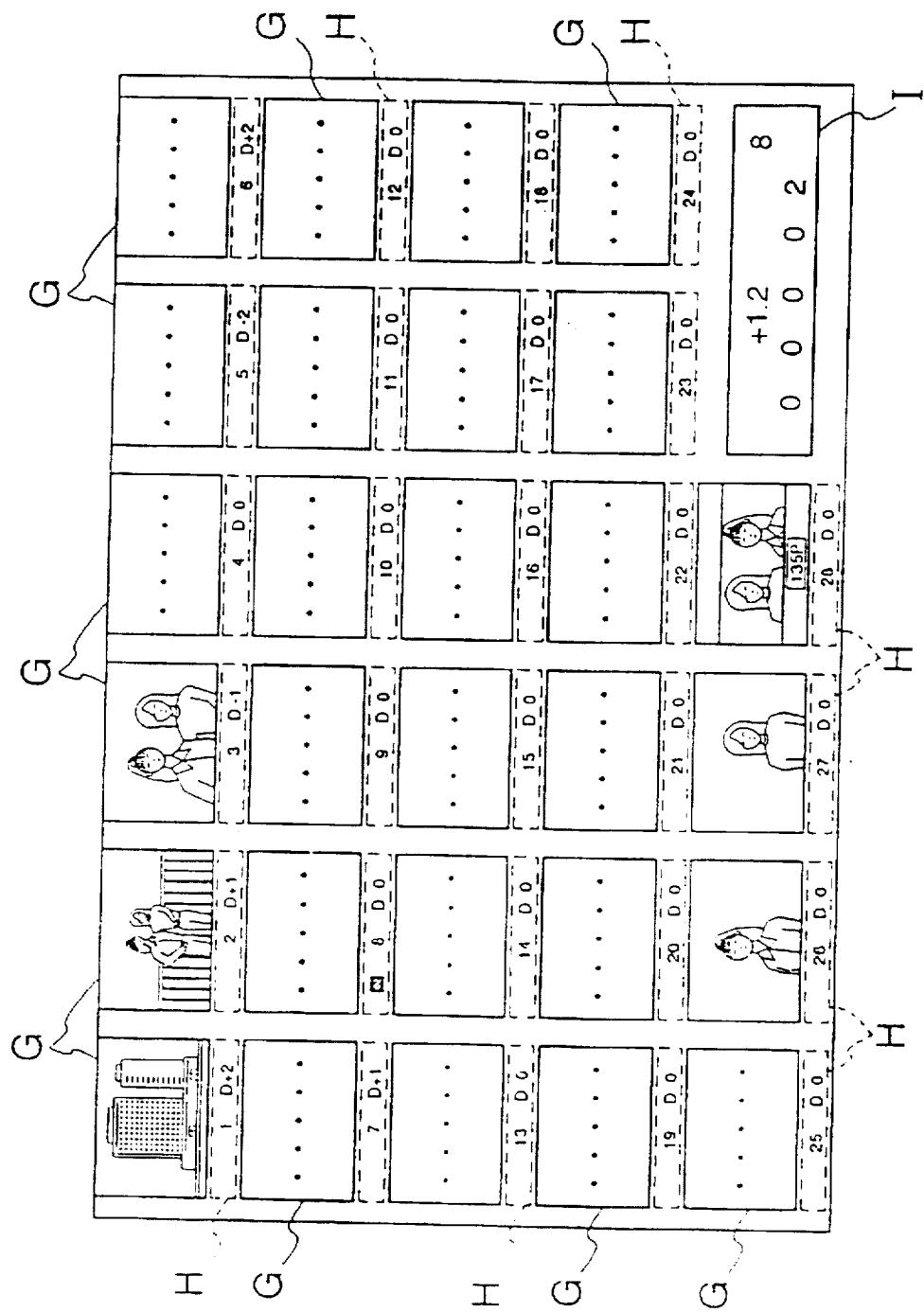
FIG. 4 is a view showing another example of images displayed on the monitor.
Figure 5:
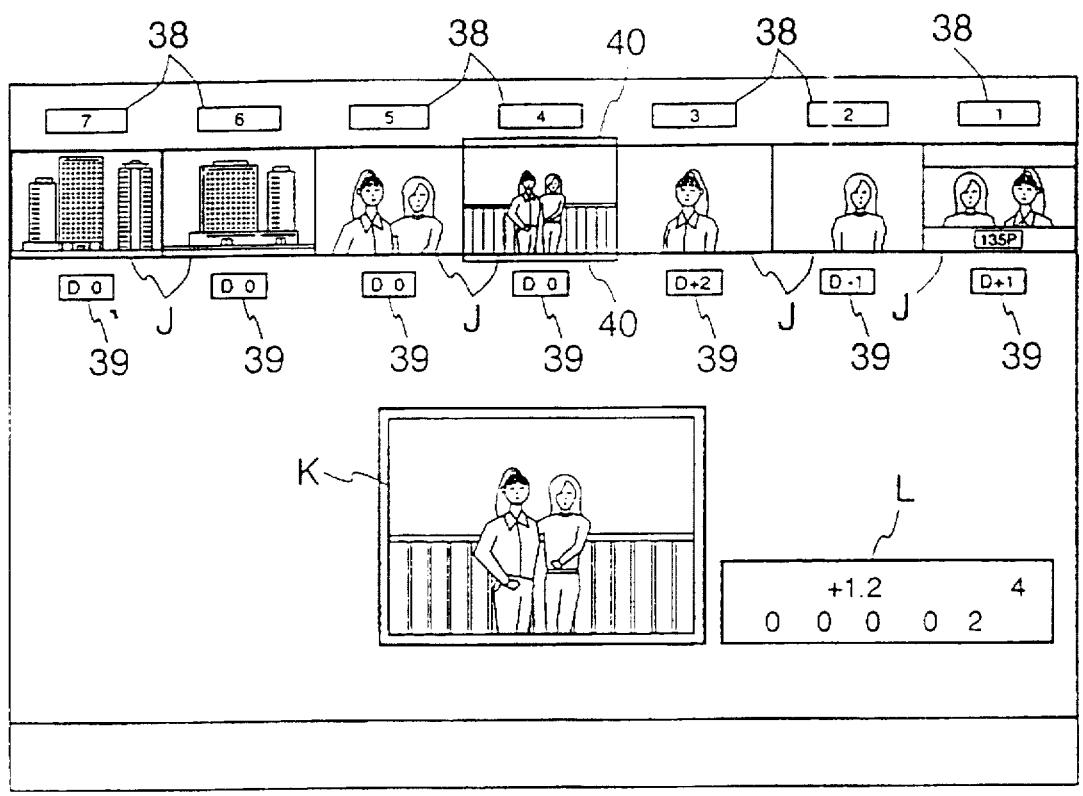
FIG. 5 is a view showing a further example of images displayed on the monitor.

The monitor MT can display image information in three display modes. FIG. 3 shows a 6-frame display mode to display image information in six frames. FIG. 4 shows a 28-frame display mode to display image information in 28 frames. FIG. 5 shows a cinema view mode to display image information in seven frames on an upper portion of the screen and to display the image information in one of the seven frames as enlarged in the center of the screen. One of the these display modes is selected through the control panel O.

The 6-frame display mode successively displays image information in groups of six frames of the film 2. This display mode includes image information display regions E for displaying the six frames in negative size, and data display regions F corresponding to the respective image information display regions E.

Figure 6:
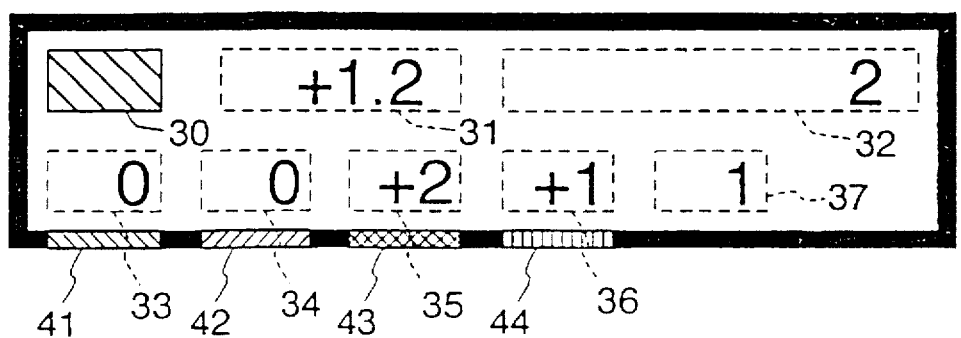
FIG. 6 is an enlarged view of part of the images displayed on the monitor.

As shown in FIG. 6, each data display region F includes a cursor display section 30, a density display section 31, a frame number display section 32, a Y-key correction value display section 33, an M-key correction value display section 34, a C-key correction value display section 35, a density key correction value display section 36, and a number of prints display section 37. The cursor display section 30 indicates that correcting instructions have been inputted through the control panel O for the frame associated therewith. The density display section 31 displays an average density value derived from photometric values of the CCD image sensor 18. The frame number display section 32 displays the frame number of the associated frame. The Y-key, M-key and C-key correction value display sections 33, 34 and 35 display correcting instructions inputted through the control panel 0 for Y, M and C colors, respectively. The density key correction value display section 36 displays correcting instructions inputted through the control panel O regarding average variations in exposure corresponding to density variations of the picture. The number of prints display section 37 displays the number of prints to be made of the associated frame as inputted through the control panel O.

Guide marks 41, 42, 43 and 44 for Y, M, C and white are displayed under the Y-key, M-key and C-key correction value display sections 33, 34 and 35 and density key correction value display section 36, respectively.

The 28-frame display mode successively displays image information in groups of 28 frames of the film 2. The most commonly used 135-size film includes a maximum of 36 frames. Thus, a large part of image information on one film 2 may be displayed on the monitor MT at a time.

As shown in FIG. 4, the 28-frame display mode includes image information display regions G for displaying the frames in negative size, and auxiliary data display regions H arranged under the respective image information display regions G. Each auxiliary data display region H displays a cursor indicating that correcting instructions have been inputted through the control panel O for the frame associated therewith, a frame number, and correcting instructions regarding average variations in exposure corresponding to density variations of the picture. This display mode further includes a data display region I disposed in the lower right position of the monitor screen for displaying data of the frame for which correcting instructions have been inputted through the control panel O.

The data display region I includes the same sections as in each data display region F in the 6-frame display mode, except the cursor display section 30.

As shown in FIG. 5, the cinema view mode includes image information display regions J for displaying seven frames in negative size on an upper portion of the screen, an enlarged display region K disposed in a slightly lower position centrally of the screen, for displaying, as enlarged, the image information in the middle one of the seven image information display regions J, and a data display region L disposed to the right side of the enlarged display region K.

The data display region L displays data of the image information displayed in the enlarged display region K, and includes the same sections as in each data display region F in the 6-frame display mode, except the cursor display section 30. Thus, the frame displayed in the data display region L is a subject of correcting instructions inputted through the control panel O.

Frame number display sections 38 are arranged over the image information display regions J for displaying frame numbers. Under the image information display regions J are density key correction value display sections 36 for displaying correcting instructions inputted through the control panel O regarding average variations in exposure corresponding to density variations of the pictures. Further, bar cursors 40 are displayed over and under the middle image information display region J whose image information is displayed also in the enlarged display region K.

In either the 6-frame display mode or the 28-frame display mode, the operator moves the cursor to designate a frame for which instructions are inputted regarding correction and the number of prints. In the cinema view mode, the operator operates the control panel O to feed the image information displayed in the image information display regions J forward, i.e. rightward, or backward, i.e. leftward, to designate a frame for which instructions are inputted regarding correction and the number of prints. If printing of the picture in a designated frame is not desired because it is out of focus or for some other reason, the operator presses a "PASS" key on the control panel O. Then, the word "PASS" is displayed in the number of prints display section 37 on the monitor MT.

As exemplified by the image information in the lower right position in FIG. 3 showing the 6-frame mode, the film 2 may include one or more panorama photos having an area of image information of different longitudinal-to-transverse ratio to that of ordinary full-size photos. Such panorama photos may be handled in the same way as image information having the ordinary longitudinal-to-transverse ratio.

When the control unit 100 detects a panorama photo on the film 2 based on a longitudinal-to-transverse ratio of image information stored in the image information memory 101, the monitor MT displays the letter "P" along with the numeral "135" representing a film size, under the image information of the panorama photo.

So-called high-vision photos or the like may be included in photos having a different longitudinal-to-transverse ratio to ordinary image information. Such photos are detected in the same way as panorama photos above, and the letter "H", for example, is displayed on the monitor MT.

Panorama photos are detected automatically by the control unit 100 as described above. To cope with a detection error, an input may also be made through the control panel O to indicate a panorama photo or a full-size photo.

When image information corresponds to a panorama photo or the like, the exposure condition computing unit 102 determines exposure conditions according to a longitudinal-to-transverse ratio of the image information, based on image information in an area of different longitudinal-to-transverse ratio to ordinary image information.

Panorama and other photos different in longitudinal-to-transverse ratio from ordinary image information are handled in the 28-frame display mode and cinema view mode in the same way as in the 6-frame display mode, as shown in FIGS. 4 and 5.

In all of the three display modes, as shown in FIGS. 3 through 5, image information is displayed as erected images. With certain types of cameras, images may be photographed in inversion.

In such a situation, an input may be made through the control panel O to cause the image information converter 103 to turn the image information on the entire film 2 180 degrees for display on the monitor MT.

It is also possible to select certain frames by operating the control panel O, and turn image information therein 90 or 180 degrees for display on the monitor MT.

Figure 7:
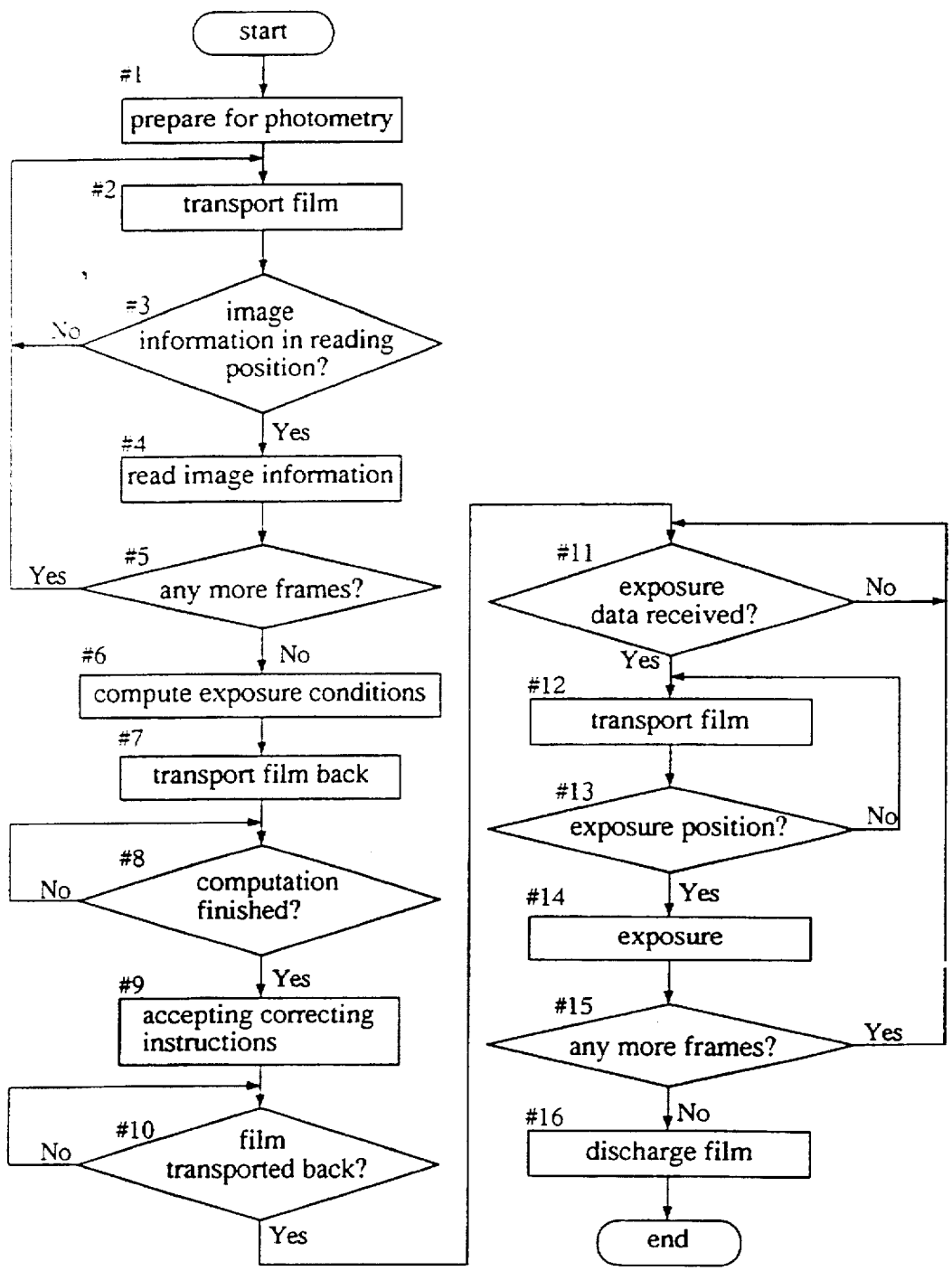
FIG. 7 is a flowchart of operation of the photographic printing apparatus.
Figure 8:
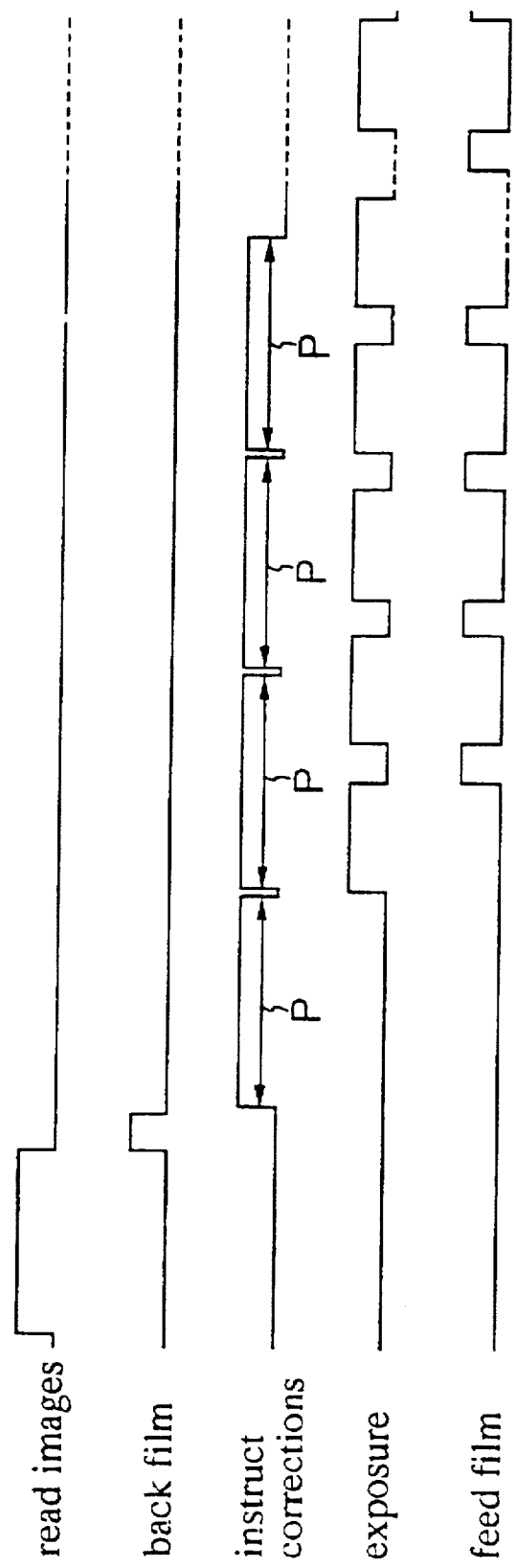
FIG. 8 is a time chart of operation of the photographic printing apparatus.
Figure 9:
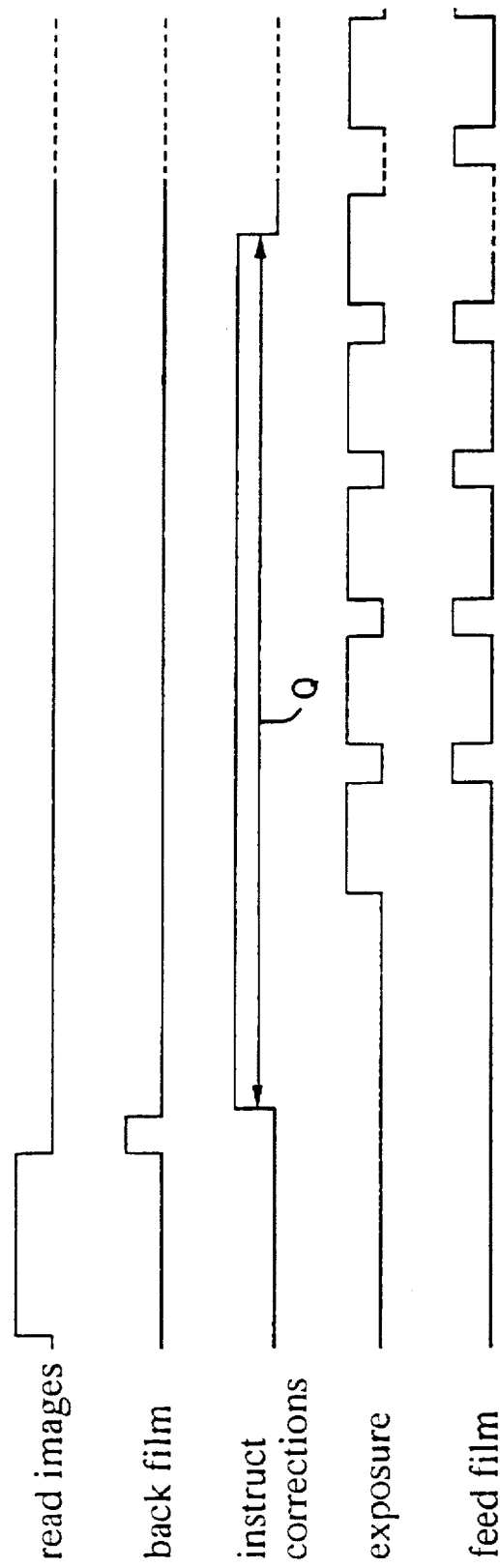
FIG. 9 is a further time chart of operation of the photographic printing apparatus.

Operations of the various components under control of the control unit 100 in the controller CO will be described hereinafter with reference to the flowchart and time charts shown in FIGS. 7 through 9.

First of all, the reflecting mirror 15 in the projecting and exposing station 5 is placed on the exposure optical path in preparation for photometry, to direct image information from the film 2 to the CCD image sensor 18 (step #1). When the preparation for photometry has been made, the motor M2 is operated to transport the film 2 in a direction indicated by an arrow N in FIG. 1, to an image information reading position with the frames of the film 2 lying in the exposure optical path (steps #2 and #3).

The film 2 is stopped at the image information reading position, and image information is read from the film 2 and stored in the image information memory 101 (step #4). This image information reading operation is continued until image information is read from all of the frames on the film 2 (step #5).

When all image information has been read from the film 2, the control unit 100 instructs the exposure condition computing unit 102 to start computing exposure conditions (step #6). The reflecting mirror 15 on the exposure optical path is replaced by the printing lens 13. The motor M2 is rotated backward to transport the film 2 in the direction opposite to the direction indicated by the arrow N in FIG. 1 (step #7).

The operation stands by in this state until the exposure condition computing unit 102 finishes the computation of exposure conditions (step #8). Upon receipt of a signal from the exposure condition computing unit 102 indicating completion of the exposure condition computation, the control unit 100 instructs the exposure condition computing unit 102 and image information converter 103 to accept correcting instructions from the control panel O (step #9). If the 6-frame display mode or 28-frame display mode is selected through the control panel O, the image information converter 103 causes the monitor MT to display image information in six or 28 frames in a batch as described hereinbefore. While observing the images displayed on the monitor MT, the operator inputs correcting instructions through the control panel O during a period P shown in the time chart of FIG. 8. In response to these correcting instructions, the exposure condition computing unit 102 corrects the exposure conditions. Then, the image information converter 103 coverts the image information again for display on the monitor MT.

When the operator has finished inputting correcting instructions for all the image information in the six or 28 frames displayed on the monitor MT, the exposure condition computing unit 102 transmits final corrected exposure conditions to the exposure control unit 104. The image information converter 103 converts image information in a next group of six or 28 frames for display on the monitor MT. The operator observes the new images on the monitor MT, and inputs further correcting instructions.

If the cinema view mode is selected at step #9, image information in the first four frames is displayed in the four image information display regions J from the left side to the middle position in FIG. 5. At this time, the image information in the middle display region J is also displayed in the enlarged display region K.

When instructions are inputted through the control panel O to correct the image information displayed in the enlarged display region K, the exposure condition computing unit 102 carries out a correcting computation. As a result, the monitor MT displays image information reconverted by the image information converter 103.

Upon completion of correction of the image information in the first frame, the image information converter 103 feeds the image information forward to the right through the image information display regions J on the monitor MT, introducing image information of a succeeding frame into the display region J at the lefthand end. Consequently, the image information displayed in the enlarged display region K, i.e. the subject of correcting instructions from the control panel O, is also renewed.

In this way, the operator successively gives instructions to correct exposure conditions. As the image information overflows the image information display regions J at the righthand end, the exposure condition computing unit 102 successively transmits final exposure conditions to the exposure control unit 104 for the frames in the order of overflow. Thus, in the cinema view mode, the operation by the operator to give instructions to correct exposure conditions is carried out continuously for one film 2 as represented by a period Q in the time chart of FIG. 9.

Referring to FIG. 5, correcting instructions have been inputted through the control panel O for the image information displayed in the three right-side image information display regions J. However, final exposure conditions for such image information remain to be transmitted to the exposure control unit 104. It is therefore possible to give further instructions to correct exposure conditions for this image information by moving the image information displays back to the middle display region J.

After acceptance of correcting instructions is started at step #9, the exposure condition computing unit 102 and image information converter 103 process the correcting instructions inputted through the control panel O as described above. On the other hand, when the control unit 100 confirms that the backward transport of the film 2 has been completed (step #10), the operation stands by until the exposure condition computing unit 102 transmits final exposure conditions to the exposure control unit 104 (step #11).

When the exposure control unit 104 has received exposure conditions from the exposure condition computing unit 102, the control unit 100 causes the film 2 to be transported until the frames thereof lie in the exposure optical path (steps #12 and #13). Based on the exposure conditions received by the exposure control unit 104, the shutter 14 and dimmer filter 11 are controlled to expose the printing paper 3 to the image information on the film 2 (step #14).

In the 6-frame display mode or 28-frame display mode, exposure conditions are transmitted to the exposure control unit 104 only after completing correction of the exposure conditions for the image information in the first six or 28 frames of the film 2. Thus, as shown in the time chart of FIG. 8, an exposure operation starts upon lapse of the period P during which instructions are given to correct exposure conditions for the image information in the first six or 28 frames.

In the cinema view mode, on the other hand, an exposure operation starts before lapse of the period Q during which instructions are given to correct exposure conditions for the image information, i.e. upon completion of instructions to correct exposure conditions for the image information in the first four frames.

When the exposure conditions are received by the exposure control unit 104, exposure of the printing paper 3 and transport of the printing paper 3 and film 2 are repeated. When exposure for the whole film 2 is completed with no frame remaining to be processed (step #15), the film 2 is discharged (step #16) to complete the exposure operation.

Thus, the projecting and exposing station 5 and exposure control unit 104 act as an exposure device S. The exposure condition computing unit 102 acts as an exposure condition computing device T for determining exposure conditions from image information read by the reading device RD. The image information converter 103 acts as an image information converting device U for converting the image information read by the reading device RD into image information expected to appear on the printing paper 3 when the printing paper 3 is exposed to the image information on the film 2 under the exposure conditions determined by the exposure condition computing device T. The control panel O acts as a correcting instruction input device V for inputting instructions to correct exposure conditions or instructions not to correct exposure conditions.

The above embodiment may be modified as follows:

(1) In the above information, the image information memory 101 has a capacity for storing image information corresponding to a plurality of frames as read by the reading device RD. Instead, this memory may have a capacity for storing image information in only one frame. Then, the image information converter 102 converts the image information corresponding to one frame for display on the monitor MT. (2) In the foregoing embodiment, the CCD image sensor 18 is employed to act as the reading device RD. A CCD line sensor or MOS image sensor may be used instead.

While the rotary color filter 17 is used to read image information as separated into R, G and B colors, CCD image sensors may be employed specially for the respective R, G and B colors.

(3) In the foregoing embodiment, image information in 6, 28 or 7 frames is displayed in each of the three display modes. Such numbers of frames to be displayed are variable.

(4) In the foregoing embodiment, the reading device RD reads image information when the film 2 is placed on the exposure optical path. The reading device RD may be provided independently of the projecting and exposing station 5. Then, the film 2 from which image information has been read by the reading device RD need not be transported backward for exposure of the photosensitive material 3.

(5) In the cinema view mode in the foregoing embodiment, what is displayed in the enlarged display region K is the image information in the middle display region J. Alternatively, the bar cursors 40 may be adapted movable by an operation through the control panel O to select a frame freely from the image information display regions J to be displayed in the enlarged display region K.

What is claimed is:

1. A photographic printing apparatus comprising:

read means for reading an image of each frame of a film;

memory means capable of storing a plurality of images of a plurality of film frames as read by said read means;

exposure condition computing means for computing exposure conditions for exposing a photosensitive material based on the images read by said read means;

an exposure unit for exposing the photosensitive material based on the exposure conditions computed by said exposure condition computing means;

image converting means for converting the frame image retrieved from said read means into an expected image which is expected to be printed on the photosensitive material if the photosensitive material is exposed to the frame image under said exposure conditions computed by said exposure condition computing means;

a monitor for displaying said expected image;

a control panel for providing to said exposure condition computing means a command whether or not to manually correct said exposure conditions of the film frame corresponding to the expected image displayed on said monitor; and a control unit for allowing, when said command has been given to at least one of frame images stored at said memory means, said exposure unit to effect a printing on to the photosensitive material of a film frame corresponding to the frame image, concurrently with correction operations of the exposure conditions for the other film frames corresponding to the other frame images.

2. A photographic printing apparatus comprising: read means for reading a frame image of each frame of a film;

memory means capable of storing a plurality of frame images as read by said read means;

exposure condition computing means for computing exposure conditions for exposing a photosensitive material based on the frame image read by said read means;

an exposure unit for exposing the photosensitive material based on the exposure conditions computed by said exposure condition computing means;

image converting means for converting the frame image retrieved from said read means into an expected image which is expected to be printed on the photosensitive material if the photosensitive material is exposed to the frame image under said exposure conditions computed by said exposure condition computing means;

a monitor capable of displaying a plurality of said expected images of a plurality of film frames;

a control panel for providing to said exposure condition computing means a command whether or not to manually correct said exposure conditions of the film frame corresponding to the expected image displayed on said monitor; and a control unit for allowing said exposure unit to effect a printing on to the photosensitive material of a film frame corresponding to one of said plural expected images displayed on said monitor on which expected image said command has been given and which has overflowed from said monitor, concurrently with correction operations of the exposure conditions for the other film frames corresponding to the other expected images.

3. A photographic printing apparatus, as defined in claim 2, wherein said control panel is capable of providing to said control unit a further command concerning a number of prints to be made on each of the film frames corresponding to the expected image displayed on said monitor.

4. A photographic printing apparatus, as defined in claim 3, wherein said monitor displays the plural expected images concerning a plurality of successive film frames, and said command and said further command concerning the print number are given on one selected from said plural expected images.

5. A photographic printing apparatus comprising:

read means for reading an image of each frame of a film;

memory means capable of storing a plurality of images of a plurality of film frames as read by said read means;

exposure condition computing means for computing exposure conditions for exposing a photosensitive material based on the images read by said read means;

an exposure unit for exposing the photosensitive material based on the exposure conditions computed by said exposure condition computing means;

image converting means for converting the frame image retrieved from said read means into an expected image which is expected to be printed on the photosensitive material if the photosensitive material is exposed to the frame image under said exposure conditions computed by said exposure condition computing means;

a monitor for displaying said expected image;

a control panel for providing to said exposure condition computing means a command whether or not to correct said exposure conditions of the film frame corresponding to the expected image displayed on said monitor; and a control unit operating off of a single exposure light source and allowing, when said command has been given to at least one of frame images stored at said memory means, said exposure unit to effect a printing on to the photosensitive material of a film frame corresponding to the frame image, concurrently with correction operations of the exposure conditions for the other film frames corresponding to the other frame images.

6. A method for exposing photosensitive material comprising the following steps:

reading an image of each frame of a film; storing a plurality of images of a plurality of said read film frames;

computing exposure conditions for a photosensitive material based upon the images read;

converting the read frame images into expected images which are expected to be printed on the photosensitive material if the photosensitive material is exposed to the frame images under the computed exposure conditions;

displaying the expected image on a monitor;

issuing a command whether or not to manually correct the exposure conditions of the film frame corresponding to the expected image displayed on the monitor; and printing a film frame, corresponding to the frame image, on the photosensitive material of at least one of the stored frame images concurrently with correcting the exposure conditions for the other film frames corresponding to the other film images.

7. A method for exposing photosensitive material comprising the following steps:

reading an image of each frame of a film;

storing a plurality of images of a plurality of said read film frames;

computing exposure conditions for a photosensitive material based upon the images read;

converting the read frame images into expected images which are expected to be printed on the photosensitive material if the photosensitive material is exposed to the frame images under the computed exposure conditions;

displaying the expected image on a monitor;

issuing a command whether or not to manually correct the exposure conditions of the film frame corresponding to the expected image displayed on the monitor; and printing a film frame, corresponding to one of the expected images displayed on the monitor and which has overflowed from said monitor, onto the photosensitive material concurrently with correcting the exposure conditions for the other film frames corresponding to the other expected images.

8. A method for exposing photosensitive material comprising the following steps:

reading an image of each frame of a film;

storing a plurality of images of a plurality of said read film frames;

computing exposure conditions for a photosensitive material based upon the images read;

converting the read frame images into expected images which are expected to be printed on the photosensitive material if the photosensitive material is exposed to the frame images under the computed exposure conditions;

displaying the expected image on a monitor;

issuing a command whether or not to correct the exposure conditions of the film frame corresponding to the expected image displayed on the monitor; and printing a film frame, corresponding to the frame image, on the photosensitive material of at least one of the stored frame images concurrently with correcting the exposure conditions for the other film frames corresponding to the other film images while using only one exposure light source for both printing and displaying steps.

* * * * *